United States Patent [19]

Mitchell, Jr.

[11] Patent Number: 4,589,425
[45] Date of Patent: May 20, 1986

[54] CONTROL APPARATUS FOR A COMBINE

[76] Inventor: Thomas A. Mitchell, Jr., Rte. #2, Liberty Center, Ohio 43532

[21] Appl. No.: 627,335

[22] Filed: Jul. 2, 1984

[51] Int. Cl.$^4$ .............................................. A01F 12/00
[52] U.S. Cl. .................................. 130/27 HF; 56/10.2; 56/DIG. 15
[58] Field of Search ............... 56/14.6, 10.2, DIG. 15; 130/27 R, 27 H, 27 HA, 27 HF

[56] References Cited

U.S. PATENT DOCUMENTS

| | | | |
|---|---|---|---|
| 2,639,569 | 5/1953 | Pasturczak | 56/DIG. 15 |
| 3,827,442 | 8/1974 | Scholz | 130/27 HF |
| 3,833,006 | 9/1974 | Temple | 130/27 HF |
| 4,466,230 | 8/1984 | Osselaere et al. | 130/27 HF |

Primary Examiner—Gene Mancene
Assistant Examiner—David I. Tarnoff

Attorney, Agent, or Firm—Emch, Schaffer, Schaub & Porcello Co.

[57] ABSTRACT

The application discloses a combine machine including an air baffle plate for adjusting air flow to a cleaning chamber used for removing waste material from grain. The cleaning chamber acts to deliver a predetermined supply of air to such grain material to remove chaff and trash material from the grain. In addition to a manual control, the air is controlled automatically by sensing the manifold pressure. The sensed air pressure is supplied to a cylinder which is connected to a link assembly and to a baffle plate which controls the air supply to the cleaning chamber. Under load the baffle plate is automatically moved toward an open position. When the load is decreased the baffle plate is moved toward a closed position to reduce the air supply delivered to the cleaning chamber.

11 Claims, 8 Drawing Figures

CONTROL APPARATUS FOR A COMBINE

BACKGROUND OF THE INVENTION

The invention relates generally to control apparatus for supplying air to the cleaning chamber of a combine. More specifically, the invention is directed to control apparatus for regulating a fan baffle plate to control the amount of air being used in the cleaning and separating phases of the combine operation. The air supply is automatically controlled in response to the intake manifold pressure.

A combine generally includes a harvesting means for removing a quantity of a crop material from a field. The harvesting means is operatively connected to a feeder means or conveyor which moves the crop material to a separator. The separator receives the crop from the feeder and removes the grain from the total harvested crop material. The separator is connected to a cleaning chamber. The cleaning means removes trash materials from the grain by supplying a predetermined volume or supply of air to the grain and trash material delivered by the separator. The cleaning means often includes a fan or blower which supplies the air to the grain. In current state-of-the-art combines, the amount of air being taken in by the fan to the cleaning means of the combine is constant. An operator of the combine manually sets the position of a fan choke such as a baffle plate at the beginning of the harvesting process. The volume of air taken into the fan means is sufficient to clean and separate the grain from the crop material when the combine is operating at full capacity. However, in many situations the combine is not operating at full capacity. For example, when the combine is being turned in the fields, or when the combine is being unloaded, the volume of air being taken into the combine by the fan means is often too great. During these situations, the intake of crop material into the combine is greatly reduced. As such, the volume of air is too great for the amount of grain being harvested. This often results in the grain being expelled from the combine along with the chaff and trash material. This often results in a waste of grain. In many prior art combines, the fan choke means is manually operated. The fan choke means is operatively connected to an indicator and crank means located in the operator's station. The indicator and crank means must be manually operated in order to adjust the fan choke means. Many times, this must be done while the combine operator is concentrating on the various other functions of the combine machine. Often, the combine operator is preoccupied with the intricacies of maneuvering the combine machine and does not act to close the fan choke means. As such, the volume of air being supplied from the fan means to the cleaning and separating means is too great for the quantity of grain material being harvested and cleaned. The large volume of air acts to blow the cleaned grain out of the combine along with the trash materials.

Thus, there is a need for a control apparatus such as a fan choke means that automatically and consistently regulates the air being taken into the combine machine. There is a further need for control apparatus that can be adapted to accommodate a variety of combines having fan choke means with various internal components and dimensions.

SUMMARY OF THE INVENTION

The present invention is directed to a control apparatus for controlling a fan choke means on a combine. Even when a combine normally includes a manually operated fan choke means, by using the present apparatus, the fan choke means is positioned and automatically controlled in a precise manner.

The present invention provides a control apparatus for automatically controlling the supply of air. A regulating means is incorporated onto an existing fan choke means such that the fan choke means automatically controls the supply of air. The regulating means is operatively attached to the existing combine frame and generally includes an activating means and a return means. The activating means is operatively connected to the combine engine such that as the operating capacity of the combine fluctuates, the fan choke means is automatically adjusted to compensate for the fluctuation in the operating capacity. The return means is positioned adjacent the activating means such that the return means normally moves the fan choke means toward a closed position when the combine machine is not operating at full capacity.

It is the object of this invention to provide an improved apparatus for automatically controlling the volume or supply of air entering a combine.

It is a further object of this invention to provide an improved control apparatus for automatically regulating a fan choke means in accordance with the crop load being harvested by the combine in a precise and automatic manner.

Other objects and advantages of the invention will become apparent as the invention is described hereinafter in detail and with reference to the accompanying drawing.

DESCRIPTION OF THE PREFERRED EMBODIMENT

It is to be understood that the concepts embodied in the control apparatus of the present invention may be applicable to various combine machines other than the combine machine shown, without departing from the scope of the invention. For example, the apparatus of the present invention may be used with any combine machine wherein the fan choke means is regulated to control the amount of air blown through the combine machine. Further, the fan choke apparatus of the present invention may be integrally connected to presently existing combine machines.

Figure 1:
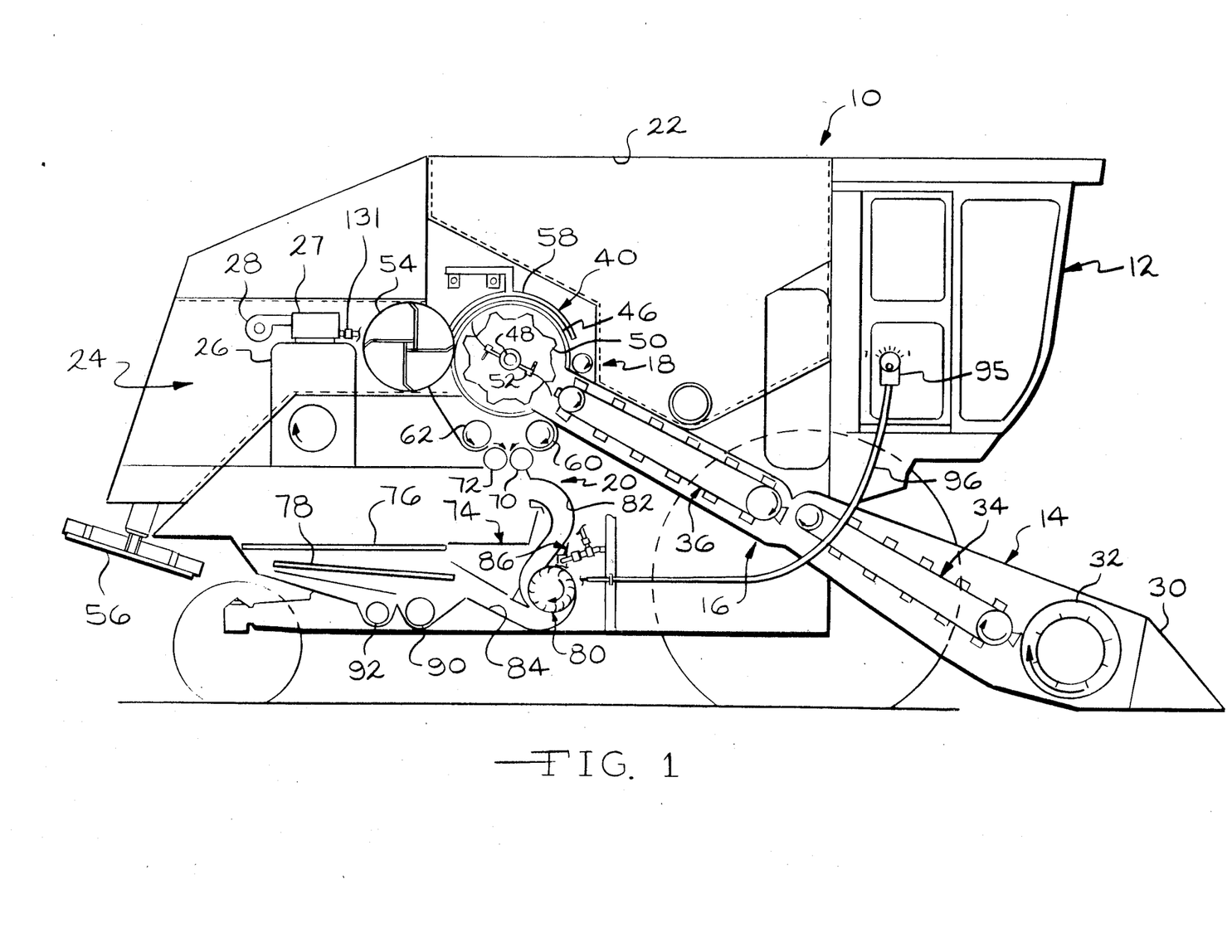
FIG. 1 is a diagramatic view of a combine machine.

Referring now to the drawings, and to FIG. 1 in particular, a combine machine 10 for harvesting, threshing, separating and cleaning a crop from a field is shown. The combine machine 10 generally includes an operator's station 12, a harvester means 14, a feeder means 16, a separator means 18, a cleaning means 20, a grain storage means 22, and an engine means 26 for supplying power for the various operations performed by the combine machine 10.

The operator's station 12 generally includes the controls and instrument panels necessary to operate the combine machine 10. The controls and instrument panels are operatively connected to the engine means 26 and to the harvester means 14, the feeder means 16, the separator means 18, the cleaning means 20, and the grain storage means 22 in a conventional manner and these connections are not shown or described in detail.

The harvester means 14, as shown in FIG. 1, is typically used for harvesting a crop such as corn. Other types of harvesting means can be operatively connected to the combine machine 10 to harvest grain crops such as wheat. The harvesting means 14 is operatively connected to the feeder means 16 in a conventional manner. The engine means 26, which generally includes a manifold 27, is operatively connected to the harvesting means 14 in a conventional manner to supply the necessary power to the harvesting means 14. During the operation of the combine machine 10, the harvesting means 14 generally acts to sense the load of the crop being harvested. If the crop load sensed is heavy, then the pressure at the engine means manifold 27 is increased and more power is supplied to the harvesting means 14. When the load of the crop being harvested decreases, then the pressure at the manifold 27 decreases and less power is supplied to the harvesting means 14. The harvester means 14 generally includes sloped gather sheets 30 and an auger 32 for collecting the crop from the field and for transporting the harvested crop material to the feeder means 16.

The feeder means 16 is located between the harvesting means 14 and the separator means 18. The feeder means 16 generally includes a front feed conveyor means 34 and a rear feed conveyor means 36 for transporting the crop material from the harvester means 14 to the separator means 18. The feeder means 16 is operatively connected to the harvester means 14 and the separator means 18 in a conventional manner, and as such, these connections are not described or shown in detail in the drawings.

The separator means 18 generally includes a cage assembly 40, a beater means 54 and a straw spreader means 58. The cage assembly 40 is transversely mounted midway between the front wheels 42 and the rear wheels 44 of the combine machine 10. The cage assembly 40 generally includes a perforated cylinder 46, a cylinder shaft 48, rasp bars 50, grain paddles 52, and a cage sweep means 58. The cylinder 46 is driven by a torque sensing variable speed belt drive and a two-speed gear box which are mounted inside the metal cylindrical cage assembly in a conventional manner. The crop material is fed into the cylinder 46 by the rear feed conveyor 36. The cylinder 46 rotates about an axis through the cylinder shaft 48. The first portion of the cage assembly 40 encountered by the crop material is an adjustable, open concave section where most of the threshing takes place. Helical or spiral bars on the inside of the cage assembly 40 and the angled rasp bars 50 on the cylinder 46 then move the material in a spiral path around the cylinder 46. Grain is separated from the crop material by centrifugal force. A plurality of paddles 52 are located at one end of the cage assembly 40. The paddles 52 radially extend from the cylinder shaft 48 and act to direct the crop material to the beater means 54. The beater means 54 acts to discharge the chaff and trash material to the straw spreader 56 at the rear of the combine machine 10. The oscillating cage sweep means 58 extends around the upper portion of the cage assembly 40 and acts to prevent build up of chaff and grain material on the top of the cage assembly 40. The grain material through the perforated cage assembly 40 and falls into a front distribution auger 60 and a rear distribution auger 62. The front and rear distribution augers 60 and 62 are located beneath the cage assembly 40 and are positioned substantially parallel to the axis of the cylinder shaft 48 of the cylinder 46. The front distribution auger 60 and rear distribution auger 62 rotate in a opposite directions. The distribution augers 60 and 62 provide a generally uniform delivery of the grain material to a front acceleration roll 70 and a rear accelerator roll 72. The front and rear acceleration rolls 70 and 72 are located beneath the front and rear distribution augers 60 and 62 and are positioned substantially parallel to the longitudinal axes through the distribution augers 60 and 62. The accelerator rolls 70 and 72 rotate in opposite directions and act to accelerate the grain material into the cleaning means 20.

Figure 2:
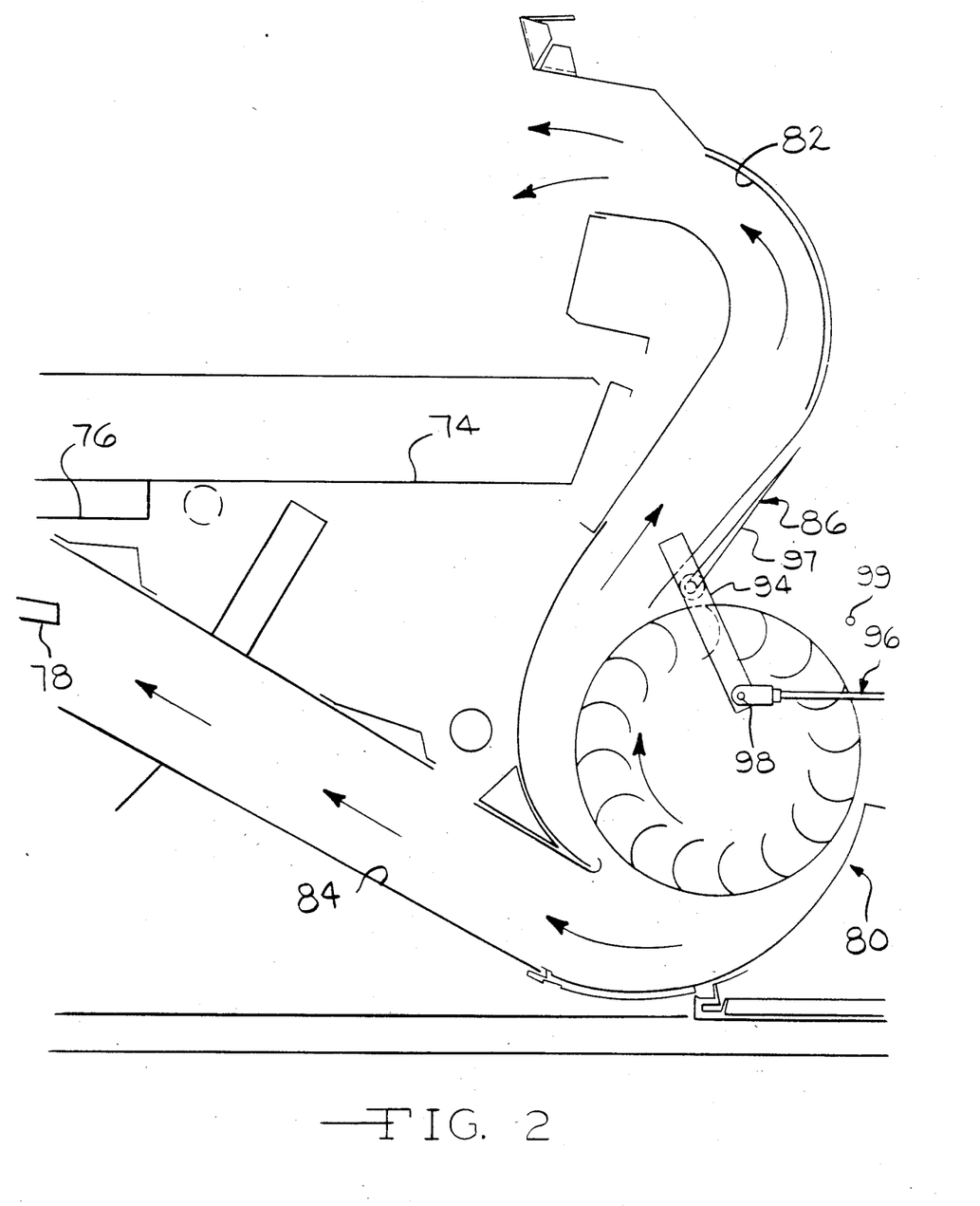
FIG. 2 is a diagramatic view showing the cleaning means and fan means of the combine machine.

The cleaning means or chamber 20 generally includes a grain shoe pan 74, a grid-like chaffer means 76, a sieve means 78, a fan means 80, a clean grain auger 90 and a tailings auger 92. The grain shoe pan 74 is located beneath the front and rear accelerator rolls 70 and 72. Grain material falling from the accelerator rolls 70 and 72 lands on the grain shoe pan 74. The grain shoe pan 74 acts to deliver the grain to the grid-like chaffer means 76 and the sieve means 78. The chaffer means 76 is located adjacent the grain shoe pan 74. The chaffer means 76 generally has an adjustable grid surface such that the diameter of the grid openings of the chaffer means 76 is adjusted to accomodate the size of the particular grain material being harvested. The grain material passing through the chaffer means 76 falls onto the sieve means 78 which is located beneath the chaffer means 76. The sieve means 78 acts to screen the grain material from the trash material. The grain material delivered by the accelerator rolls 70 and 72 to the grain shoe pan 74, the chaffer means 76 and the sieve means 78 is passed through a band of high-velocity air delivered by the fan or blower means 80. The band of air acts to clean chaff and fine particulate trash material from the grain material. The fan means 80 is located in close adjacent relationship to the grain shoe 74, the chaffer means 76 and the sieve means 78. The fan means 80 generally includes a separator duct 82, a lower fan outlet duct 84, and a fan choke means 86. The fan choke means 86 extends across the entire width of the fan means 80. The fan choke means 86 acts to generally control the volume or supply of air taken into the fan means 80 from the area directly in front of the fan means 80. The fan choke means 86 acts to control the volume of air supplied by the fan means 80 through the separator duct 82 and the lower fan outlet duct 84. The fan means 80 acts to deliver a band of high-velocity air through the separator duct 82 to the grain material as the grain material falls onto the grain shoe pan 74. The band of high-velocity air from the separator duct 82 acts to remove a large amount of trash material from the grain material, thereby reducing the volume of trash material to be cleaned by the grain shoe pan 74 and the chaffer means 76. The band of air blows the trash material towards the straw spreader means 56, while the grain falls onto the grain shoe pan 74. The grain and the remaining fine particulate trash material fall through the chaffer means 76 onto the sieve means 78. The fan means 80 also acts to deliver a controlled volume of air through the lower fan outlet duct 84 to the grain and trash material that fall through the chaffer means 76 onto the sieve means 78. The controlled volume of air flowing from the lower fan outlet duct 84 acts to remove the remaining fine particulate trash material from the grain material.

The cleaned grain then falls through the sieve means 78 to the clean grain auger 90. The clean grain auger 90 is located beneath the sieve means 78. The clean grain auger 90 in a conventional manner acts to move the grain to a clean grain elevator (not shown) and into the grain storage bin 22. A tailings auger 92 is located in spaced apart relationship to the clean grain auger 90. The tailings auger 92 and a tailings elevator (not shown) act to recirculate the tailings or remaining uncleaned grain material back to the accelerator rolls 70 and 72 for recleaning of the grain material.

During the harvesting and cleaning operations of the combine machine 10, it is desirable to have as much air as possible supplied to the chaffer means 76 and sieve means 78 without blowing the grain out of the combine 10. The fan choke means 86 is adjusted to control the volume of air being supplied by the fan means 80 to the separator duct 82 and the lower fan outlet duct 84. The fan choke means 86 is operatively connected to an indicator and crank means 95 located in the operator's station 12 by a mechanical linkage means 96. The mechanical linkage means 96 is connected to the fan choke means 86 in a conventional manner such that, as the indicator and crank means 95 is manually turned in one direction, the fan choke means 86 is moved to an open position, thereby increasing the volume of intake air to the fan means 80. The indicator and crank means 95 is then manually turned in the opposite direction to decrease the volume of intake air to the fan means 80.

The fan choke means 86 includes a horizontally extending fan choke plate or baffle plate 97 operatively connected to a fan choke arm 94 and a pivot pin 98. The plate 97 is positioned adjacent the intake area of the fan means 80. The fan choke arm 94 and pivot pin 98 operatively connect the fan choke plate 97 to the mechanical linkage 96. The fan choke means 86 is movable toward a closed position by the rotation of the indicator and crank means 95 in one direction. As the crank means 95 is manually rotated by the operator in the operator's station 12, the plate 97 is pivoted about the axis of the pivot pin 98 in a direction towards a stop block 99. The stop block 99 is positioned adjacent the fan means 80 and is attached to the frame of the combine 10. The stop block 99 acts to limit the downward travel of the fan choke plate 97. As the fan choke plate 97 pivots about the pivot pin 98, the fan choke plate 97 is moved to a closed position and is positioned adjacent the intake area of the fan means 80. The fan choke plate 97 acts to reduce the volume of air taken into the fan means 80. The reduction in volume of intake air into the fan means 80 thereby causes a reduction in air output by the fan means 80 through the separator duct 82 and the lower fan outlet duct 84.

When the combine machine 10 is being operated through a field to harvest a crop, it is desirable to have the fan choke means 86 in an open position in order to allow the increased volume of high-velocity air supplied from the fan means 80 to the separator duct 82 and the lower fan outlet duct 84 to clean the grain material falling from the accelerator rolls 70 and 72 into the shoe grain pan 74. However, when the amount of crop material being harvested by the combine machine 10 decreases, such as when the combine machine 10 is being turned in the field to start harvesting a new row of crops, or when a light or bare spot occurs in the crop field, it is desirable to have a lower volume of intake air supplied by the fan means 80 to the separator duct 82 and the lower fan outlet duct 84. It is therefore necessary to move the indicator and crank means 95 to a closed position, while simultaneously operating the necessary controls for turning or maneuvering the combine 10.

In order to efficiently control the volume of high-velocity air supplied by the fan means 80, the apparatus includes automatic control means, according to the present invention. The fan choke means 86, as seen in FIGS. 3-8, includes a control or regulating means 111. The control or regulating means 111 operatively connected to the fan choke means 86 such that the fan choke means 86 controls the volume of air entering the fan means 80 to a precise manner. The regulating means 111 includes an activating means 113 and a return means 115. The activating means 113 is operatively attached to a frame section 112 of the combine 10 by a bracket assembly 114 and a pivot pin 116. In the embodiment shown, the activating means 113 includes a cylinder 121, a pivot pin 123, and a link 125. The cylinder 121, which in this embodiment is an air cylinder, has a cylinder rod 129. A sensing conduit 131 supplies air to the cylinder 121. The conduit 131 is operatively connected to the engine manifold 27.

Figures 3, 4:
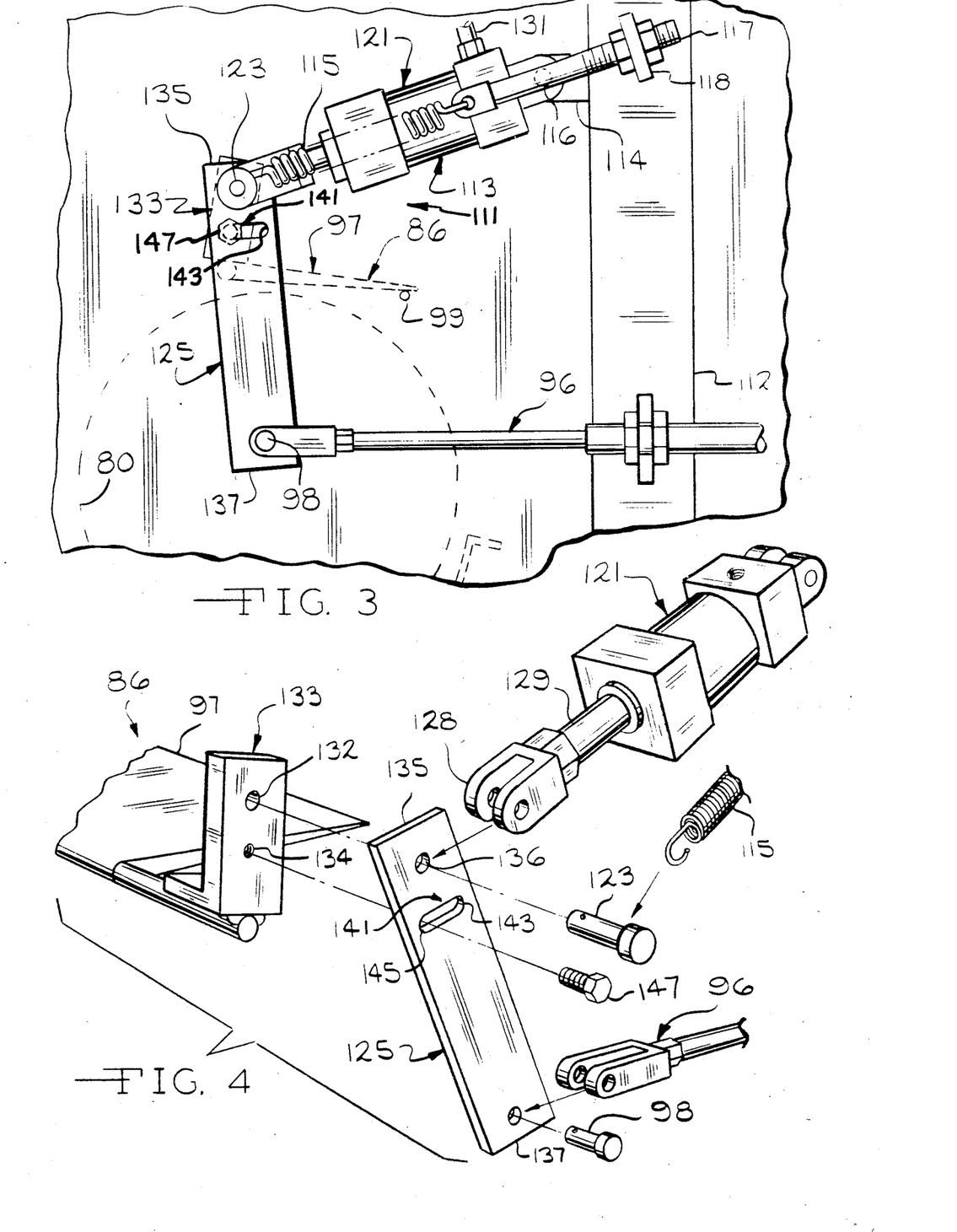
FIG. 3 is an elevational view, partially in phantom, showing the positioning means.
FIG. 4 is an exploded view of the positioning means.

The cylinder rod 129 of the cylinder 121 is connected to the fan choke plate 97 by a bracket 133. The bracket 133 is attached to one end of the fan choke plate 97. The bracket 133 generally has an L-shape and is positioned on the end of the fan choke plate 97 that is adjacent the pivot pin 98. The pivot pin 123 coaxially extends through the distal end 128 of the cylinder rod 129 and through a first aperture 132 in the bracket 133. The pivot pin 123 operatively attaches the cylinder rod 129 to the bracket 133. The pivot pin 123 also operatively attaches the cylinder rod 129 and the bracket 133 to the link 125. The link 125 is located adjacent the bracket 133 and the distal end 128 of the cylinder rod 129. The link 125 has a first end 135 and a second end 137. The first end 135 of the link 125 includes a first aperture 136. The pivot pin 123 coaxially extends through the distal end 128 of the cylinder rod 129, the first aperture 136 in the link 125, and the first aperture 132 in the bracket 133. The link 125 is also operatively connected to the mechanical linkage 96. The link 125 has a second end 137 which is in opposed relationship to the first and 135. The link 125 includes a second aperture 138 which extends through the second end 137 of the link 125. The pivot pin 98 coaxially extends through the second aperture 138 in the link 125 and connects the link 125 to the mechanical linkage 96.

The link 125 further includes a slot 141 which is located adjacent the first end 135 of the link 125. The link 125 is further connected to the bracket 133 by a shoulder bolt 147 which is positioned in the slot 141 and which extends through a second aperture 134 in the bracket 133.

The return means 115 which comprises a spring is positioned adjacent the cylinder 121. The spring 115 is connected to the pivot pin 123 adjacent the distal end 128 of the cylinder rod 129. The spring 115 extends from the pivot pin 123 and is anchored to the frame section 112 of the combine by a threaded bracket assembly 118. The spring 115 is attached to a threaded bolt member 117 which is received by the threaded bracket assembly 118. The tension on the spring 115 is adjusted by advancing the threaded end of the bolt member 117 relative to the threaded bracket assembly 118.

During the operation of the combine 10, the turbo charged engine 26 acts to supply power to the various above-described harvesting, feeding, separating and cleaning operations. As the load of the crop material being harvested increases, the engine 26 acts to supply additional power to the harvesting means 14. When a heavy crop load is sensed by the harvesting means 14 the pressure at the manifold 27 is increased and more power is supplied to the harvesting means 14. As the load of the crop material being harvested decreases, less power is supplied to the harvesting means 14. When the crop load lightens the pressure at the manifold 27 decreases and less power is supplied to the harvesting means 14.

When the pressure of the manifold 27 increases, such pressure is supplied through the conduit 131 to the cylinder 121 to move the cylinder rod 129 to an extended position. The extended cylinder rod 129 acts to pivot the combination of the link 125, the bracket 133 and the fan choke plate 97 around the pivot pin 98. The bracket 133 and the fan choke plate 97 also pivot about an axis through the pivot pin 123. During increased loading the fan choke means 86 is moved to an open position with the plate 97 pivoting around the pivot pin 123 to the open position. Simultaneously, as the cylinder rod 129 continues to extend the shoulder bolt 147 slideably moves in the slot 141 in the link 125. Engagement of the bolt 147 against the end of the horizontal slot 141 limits the degree of angular rotation of the bracket 133 and the plate 97 relative to the link 125. The cylinder 121 acts to hold the fan choke means 86 in the open position such that the volume of air, which being taken into the fan means 80, is great enough to efficiently clean the trash material from the grain. As the crop load sensed by the harvesting means 14 lightens, the pressure at the manifold 27 decreases. The decreased pressure at the manifold 27 causes a decrease in the air pressure supplied by the conduit 131 to the cylinder 121 of the regulating means 111. When the cylinder force falls below the force of the return spring 115, the spring 115 pivots the fan choke plate 97 about the pivot pin 123 in a FIG. 3 clockwise direction towards the stop block 99. The stop block 99 limits the downward travel of the fan choke plate 97. The spring 115 acts to hold the fan choke means 86 in a "closed" position such that the volume of air being taken into the fan means 80, is substantially reduced. The volume of high-velocity air subsequently blown through the separator duct 82 and the lower fan outlet duct 84 by the fan means 80 is also reduced. The fan choke plate 97 acts to reduce the volume of air entering the fan means 80. The resulting lessened volume of air supplied by the fan means 80 to the cleaning means 20 allows the grain material being harvested to drop onto the grain shoe pan 74 and through the chaffer means 76 and the sieve means 78 to the clean grain auger 90 rather than be blown out of the combine 10. In the machine 10 shown in the drawings, when the combine 10 is under load, the boost pressure or intake manifold pressure would be in the order of 24 psi., while the unloaded boost pressure falls to 12 psi.

It has been found that if the position of the fan choke plate 97 is not carefully regulated, large amounts of grain are dumped and wasted as combine travels through light loading areas and through turns.

Figure 5:
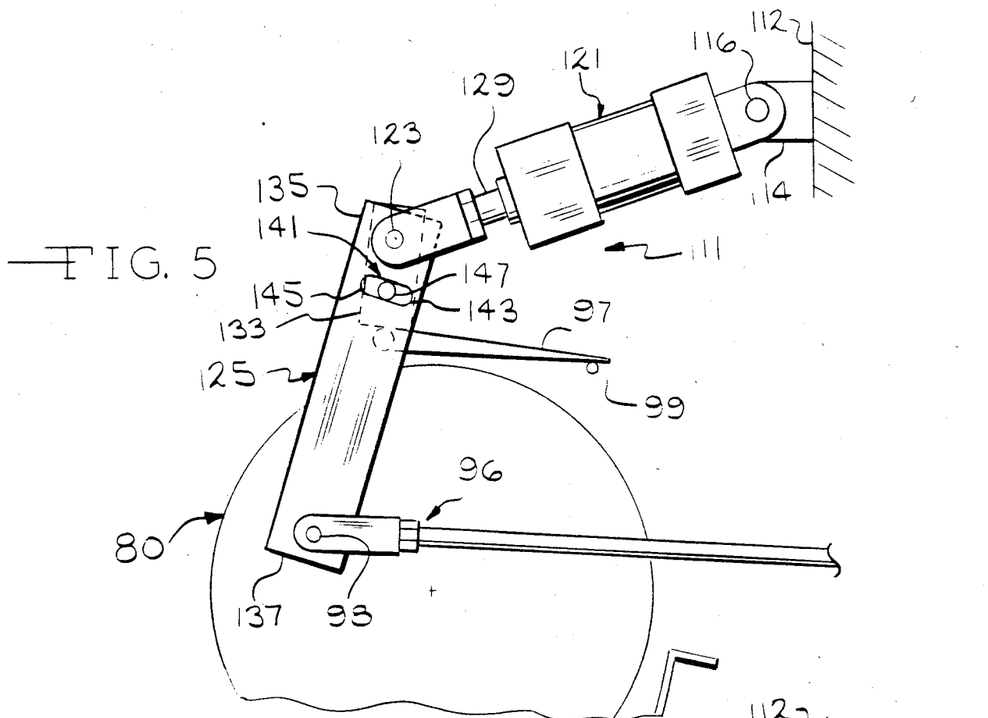
FIG. 5 is an elevational view, partially in phantom, showing the indicator and crank means in a closed position and the activating means in a closed position.

During the operation of the combine machine 10, the combine operator adjusts the maximum volume of air taken into the fan means 80 according to the type of crop being harvested by manually initially setting the fan indicator and choke means 95 in a predetermined position. When a small, lighterweight grain crop is being harvested, a smaller volume of high-velocity air is delivered to the cleaning means 20. Before starting to harvest the crop from the field, the fan indicator and crank means 95, located in the operator's station 12, is set or moved to the closed position. As seen in FIG. 5, the mechanical linkage 96 when in the closed position, acts to move the lower end 137 of the link 125 to an extended position and pivots the lower end 137 of the link 125 about an axis through the pivot pin 123. As the mechanical linkage 96 is moved to the closed position and the link 125 is pivoted about the pivot pin 123, the shoulder bolt 147 is slideably moved to a mid-point in the slot 141 in the link 125. The fan choke means 86 approaches the closed position.

As the combine 10 begins to harvest a crop, the pressure at the manifold 27 activates the regulating means 111 and causes the activating means 113 to move the fan choke means 86 toward the open position. The manifold 27 supplies increased pressure through the conduit 131 to the cylinder 121. As the cylinder rod 129 extends, the bracket 133 and the link 125 are pivoted about the pivot pin 98. In addition, the bracket 133 pivots about the upper pivot pin 123 relative to the link 125. The choke plate 97 is rotated in a direction away from the stop block 99, thereby increasing the air intake area of the fan means 80. Simultaneously, as the cylinder rod 129 extends, the shoulder bolt 147 is slideably moved along the slot 141 in the link 125. The extension of the cylinder rod 129 and the movement of the fan choke plate 97 is such that the activating means 113 is pivoted about an axis through the pivot pin 116 in the bracket assembly 114. As the combined engine 26 continues to harvest the crop from the field, the pressure at the manifold 27 continues to increase, thereby causing more pressure to be supplied through the conduit 131 to the activating means 113. The shoulder bolt 147 is slideably moved along the slot 141 until it abuts an end portion 143 of the slot 141 (See FIG. 6). The end portion 143 acts to limit the travel of the shoulder bolt 147 along the slot 141, thereby stopping the upward travel of the fan choke plate 97.

As the pressure at the manifold 27 fluctuates, the pressure supplied to the activating means 113 also fluctuates such that the activating means 113 moves the fan choke means 86 toward the open and closed positions. The cylinder 121 acts to simultaneously pivot the link 125 about the axis through the pivot pin 98 while pivoting the fan choke plate 97 about that axis and the axis through the pivot pin 123. The cylinder 121 also acts to slideably move the fan choke pivot pin 123 along the slot 141 in the link 125 such that a predetermined maximum opening and closing positions are achieved in accordance with the manual setting of the indicator and crank means 95. The fan choke plate 97 is moved in a direction either towards or away from the stop block 99. The fan choke plate 97 regulates the amount of air entering the fan means 80. Thus, the volume of air supplied by the fan means 80 to the separator duct 82 and the lower fan outlet duct 84 of the cleaning means 20 is varied according to the crop load being harvested. When the pressure at the manifold 27 increases, the pressure supplied to the activating means 113 also decreases. The spring 115 acts to rotate the fan choke plate 97 in a direction towards the stop block 99, thereby decreasing the volume of air being taken into the fan means 80.

Figure 7:
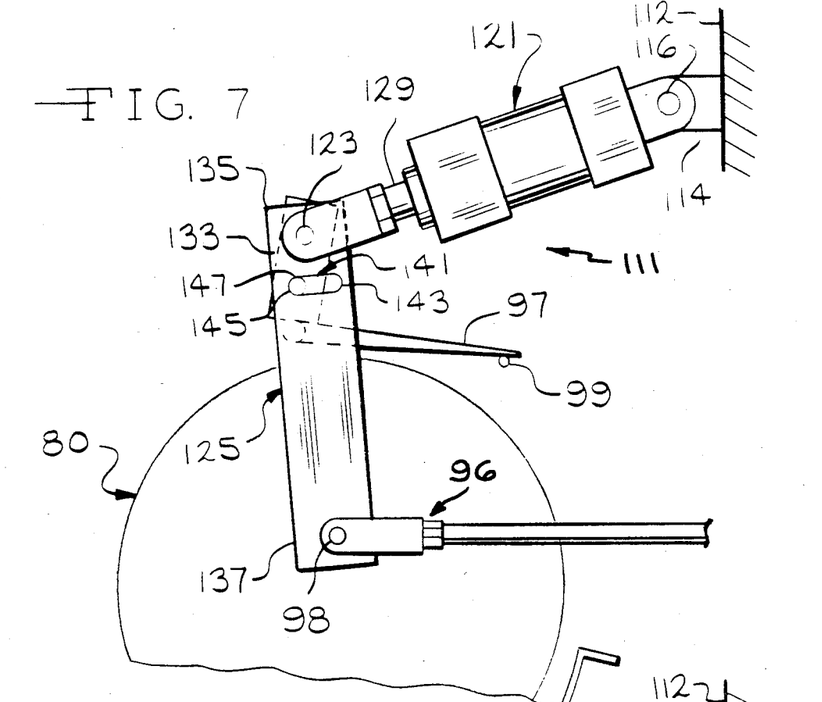
FIG. 7 is an elevational view, partially in phantom, showing the indicator and crank means in an open position and the activating means in a closed position.

When a larger, heavier grain crop is being harvested a greater volume of air delivered to the cleaning means 20 is required in order to clean the trash material from the grain material. Before starting to harvest the crop from the field, the fan indicator and choke means 95 is manually set or moved a predetermined position. As shown in FIG. 7, the mechanical linkage 96, when moved toward the open position, acts to move the lower end 137 of the link 125 to a retracted position and pivots the lower end 137 of the link 125. As the mechanical linkage 96 is moved toward the open position, the upper end 135 of the link 125 is pivoted about the axis through the pivot pin 123 and the shoulder bolt 147 is slideably moved toward an opposite end portion 145 of the slot 141. The fan choke means 86 is urged toward the closed position by the spring 115.

As the combine 10 is operated, increased pressure at the manifold 27 activates the regulating means 111 and causes the activating means 113 to move the fan choke means 86 toward the open position. The manifold 27 supplies pressure through the conduit 131 to the cylinder 121. The cylinder 121 acts to extend the cylinder rod 129. As the cylinder rod 129 extends, link 125 is pivoted about the axis through the pivot pin 98, while the plate 97 also pivots about the pivot pin 123. The fan choke plate 97 is rotated in a direction away from the stop block 99 such that the intake air area of the fan means 80 is increased. Simultaneously, as the cylinder rod 129 extends, the shoulder bolt 147 is slideably moved along the slot 141 from a point adjacent the end portion 145 towards the opposite end portion 143.

Figure 8:
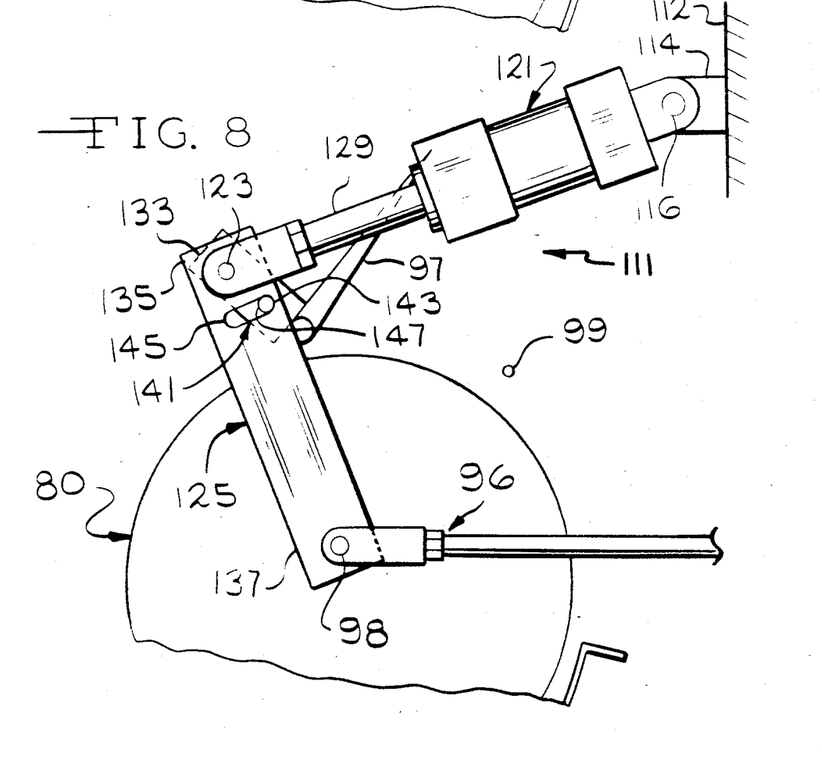
FIG. 8 is a view similar to FIG. 7 showing the activating means in an open position.

Referring to FIGS. 7 and 8, when the mechanical linkage 96 is moved toward a retracted position, the fan choke plate 97 is free to move through a greater arc, since the travel of the shoulder bolt 147 between the ends 145 and 143 of the slot 141 is greater. The fan choke plate 97 is thus moved toward a maximum open position in accordance with such a predetermined setting of the indicator and crank means 95. The extension of the cylinder rod 129 and the movement of the fan choke plate 97 is such that the activating means 113 is pivoted about the pivot pin 116 by the movement of the cylinder rod 129 and the link 125. As the combine engine 26 continues to operate, the pressure at the manifold 27 continues to increase, thereby causing more pressure to be supplied through the conduit 131 to the activating means 113. The shoulder bolt 147 is slideably moved along the slot 141 until it abuts the end portion 143 of the slot 141. The end portion 143 acts to limit the travel of the shoulder bolt 147 along the slot 141, thereby stopping the upward travel of the fan choke plate 97.

Figure 6:
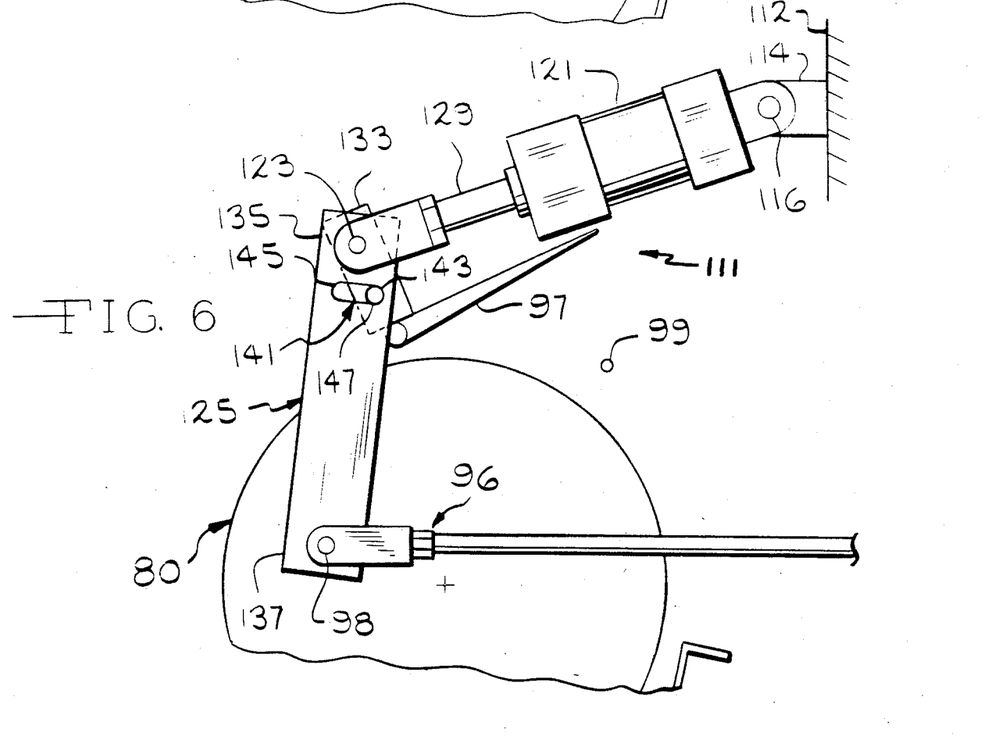
FIG. 6 is a view similar to FIG. 5 showing the activating means in an open position.

Referring to FIGS. 5 and 6, if the mechanical linkage 96 is extended, the plate 97 can only travel through a lesser arc because the plate 97 engages the stop block 99 prior to the time that the shoulder bolt 147 moves to a point adjacent the stop end 145 of the slot 141 (See FIG. 5). Therefore, when the linkage 96 is manually set in the extended position, the maximum opening of the plate 97 is curtailed during the automatic movement resulting from the above-described sensing of the boost pressure.

Various modifications and substitutions can be made with respect to the disclosed embodiment without departing from the scope of the invention as defined in the following claims.

What I claim is:

1. A combine apparatus for harvesting a crop material from a field comprising:
   engine means for driving the combine;
   harvesting means for removing a quantity of such crop material from such field;
   cleaning means for separating grain material and trash material from such crop material, said cleaning means acting to deliver a predetermined volume of air to such grain material and said trash material, said cleaning means acting to expel such trash material from said combine apparatus;
   said cleaning means including a fan means for delivering such volume of air to such grain material, a baffle plate being pivotally mounted and adjacent said fan means, and a mechanical linkage means for moving said baffle plate between the open and closed positions;
   regulating means for controlling the supply of air delivered to such grain material and such trash material, said regulating means including an activating means, said activating means being pivotally mounted and positioned adjacent said fan baffle plate, said activating means pivoting said plate toward an open position relative to said fan means, and a return means for urging said fan choke means toward a closed position; said regulating means, when moved toward the open position acting to allow a greater volume of air to be delivered to such grain material, said regulating means upon moving toward the closed position reducing the volume of air delivered to such grain material, said regulating means acts to move between the open and closed positions in accordance with the load on said engine means.

2. The combine apparatus of claim 1 wherein said cleaning means includes a fan means for delivering the supply of air to such grain material, a baffle plate being pivotally mounted and adjacent said fan means, and a mechanical linkage means for moving said baffle plate between the open and closed positions.

3. The combine apparatus of claim 2 wherein said regulating means is attached to said fan means, said regulating means including an activating means, said activating means being pivotally mounted and positioned adjacent said fan baffle plate, said activating means pivoting said plate toward the open position relative to said fan means, and a return means for urging said fan choke means toward the closed position.

4. The combine apparatus of claim 3 wherein said activating means includes a cylinder means and a link means, said cylinder means being operatively attached to said link means and said fan choke means, whereby extension and retraction of said cylinder means moves said fan choke means toward and away from an open position to increase and decrease such volume of air.

5. The combine apparatus of claim 4 wherein said cylinder means comprises an air cylinder.

6. The combine apparatus of claim 3 wherein said return means includes a spring.

7. Control apparatus for use with a combine machine which includes harvesting and feeder means for harvesting a crop and conveying such crop, an engine means operatively connected to such harvester and feeder means, said engine means including an intake air manifold, means adjacent such feeder means for separating and cleaning such crop, including air blower means for separating waste material from the grain, said air blower means including a baffle plate for adjusting the air supplied and manual means for adjusting the position of said baffle plate, including a mechanical linkage, the invention comprising a link assembly for connection to said baffle plate and to said manual means, a cylinder connected to said link assembly for moving said baffle plate toward a first position, return means for urging said linkage assembly toward a second position, and a sensing means for operatively connecting the air manifold to said cylinder, whereby said cylinder and said return means operate in response to the air pressure sensed at the air manifold to automatically move said baffle plate and further adjust the air supplied.

8. Control apparatus, according to claim 7, wherein said return means comprises a spring.

9. Control apparatus, according to claim 7, wherein said link assembly includes a bracket member for connection to said baffle plate, a link having an upper end and a lower end, said upper end being pivotally mounted to said bracket member, said lower end being connectable to said manual means, said upper end being operatively connected to said cylinder and said return means.

10. Control apparatus, according to claim 7, wherein said link defines a generally horizontal slot and pin means received by said slot and connected to said bracket member, whereby the ends of said slot defines limits of rotation of said baffle plate.

11. Control apparatus, according to claim 10, including stop means for engaging said baffle plate.

* * * * *